United States Patent [11] 3,615,825

[72] Inventor Robert E. Gansser
 Riverview, Mich.
[21] Appl. No. 801,788
[22] Filed Feb. 24, 1969
[45] Patented Oct. 26, 1971
[73] Assignee BASF Wyandotte Corporation
 Wyandotte, Mich.

[54] PAINT-STRIPPING COMPOSITION
 5 Claims, No Drawings
[52] U.S. Cl. ........................................ 134/38,
 134/2, 252/DIG. 8, 252/152, 252/153, 252/158,
 252/171, 260/584 C
[51] Int. Cl. .................................... C09d 9/00,
 C11d 7/06
[50] Field of Search ........................... 252/152,
 156, 158, 153, 171; 260/584 C; 134/38

[56] References Cited
 UNITED STATES PATENTS
1,467,654 9/1923 Scoles ........................ 252/156
2,433,517 12/1947 Kuentzel ..................... 252/154
2,898,246 8/1959 Hannah ....................... 252/156 X
3,076,819 2/1963 Heise .......................... 260/584 C
3,179,609 4/1965 Morison ...................... 134/38 X
3,129,106 4/1964 Katz ........................... 260/584 C
3,397,238 8/1968 Hobbs ......................... 260/584 C
 FOREIGN PATENTS
718,874 9/1965 Canada ....................... 252/156
 OTHER REFERENCES
 Lesser, Soap & Sanitary Chemicals, Feb. 1953, pp. 133–136, 161

Primary Examiner—Leon D. Rosdol
Assistant Examiner—Arnold I. Rady
Attorneys—Charles G. Lamb, Cedric H. Kuhn, Robert E. Dunn, Bernhard R. Swick and Joseph D. Michaels ABSTRACT: Paint-stripping compositions are prepared by combining alkoxyalkyl amines with alkaline solutions. These compositions are effective for stripping paints, particularly enamel paints, from metals and surfaces of other materials.

PAINT-STRIPPING COMPOSITION

This invention relates to paint-stripping compositions. In one aspect, it relates to improved alkaline paint stripper compositions. In another aspect, the invention relates to paint strippers which are particularly effective in removing enamel paints from metal and other surfaces.

It is known in the art that surface coatings can be removed by the use of aqueous alkali metal hydroxide solutions. It is also known that certain additives, such as alkylamines, may be added to the solutions to accelerate the paint-stripping process. However, the amines presently used in combination with alkali metal hydroxides for paint stripping have two major disadvantages. Firstly, low-molecular-weight alkylamines are very odoriferous at ambient or use temperatures. This is due to the fact that they have high vapor pressure properties and vaporize quite readily at these temperatures. Secondly, higher molecular weight alkylamines having lower vapor pressures have been found to have decreased activity in combination with alkali metal hydroxide solutions in stripping coated surfaces.

It is, therefore, an object of this invention to provide a paint-stripping composition having superior effectiveness for removing coatings from coated surfaces. It is another object of this invention to provide a novel amine-containing alkaline paint-stripping composition having a low odoriferous content. It is a further object of this invention to provide a composition that is effective for stripping surfaces coated with enamel paint. Other objects and advantages of this invention will become apparent to those skilled in the art upon consideration of the accompanying disclosure.

The present invention resides in a paint stripping composition. Broadly speaking, the paint-stripping composition comprises an alkali metal hydroxide, an amine, and water. More specifically, the composition of this invention comprises from about 10 to 25 percent by weight of an alkali metal hydroxide, from about 0.5 to 5 percent by weight of an alkoxyalkylamine, with the balance of the composition being water. The composition may also include a thickening agent in addition to the aforementioned components.

Alkali metal hydroxides that can be used in preparing the composition of this invention include, for example, sodium hydroxide, potassium hydroxide, lithium hydroxide, and the like.

The amines that can be used in the practice of this invention are alkoxyalkylamines having a molecular weight of less than 104 and a boiling point of greater than 100° C. Alkoxyalkylamines which fall within this parameter include, for example, ethoxyethylamine, 3-methoxypropylamine, 2-methoxypropylamine, propoxyethylamine, 2-ethoxypropylamine, 3-ethoxypropylamine and the like. The preferred alkoxyalkylamines are ethoxyethylamine and 3-methoxypropylamine.

In order to impart thixatropic properties to the composition, a thickening agent may be included in the composition. Any suitable thickening agent may be employed. These include, for example, starches, flours, methylcellulose, glue, and the like.

In addition, the solution may also contain synthetic organic surface active agents as well as soaps, sequestering agents, dispersing or suspending agents.

It has been found that the paint-stripping composition is particularly effective in stripping enamel-type paints from metal surfaces. In stripping these coatings from the metal surfaces, the composition can be applied by any suitable means, for example, with a brush or by spraying. After the solution is applied, it is allowed to set for a period of time sufficient to loosen the enamel coating. This generally requires from 15 minutes to 8 hours, depending upon the number of coatings to be stripped, the resistivity of the particular coatings, as well as the thickness of the coatings. The loosened coating or coatings are then removed from the surface. This is usually accomplished by applying a clear stream of water to the surface, thereby dislodging the coatings and leaving a paint-free surface. However, it is to be understood that other methods can be used to remove the loosened coatings. For example, a scraper can be used to scrape the surface and thereby remove the coatings.

In a preferred embodiment of formulating a composition of this invention, from about 1 to 5 parts by weight of a thickening agent is added to about 55 to 85 parts by weight of water at a temperature of about 5° to 90° C. The solution is stirred until all of the thickening agent is completely dispersed. To this solution from about 0.5 to 5 parts by weight of an alkoxyalkylamine is added. This solution is also thoroughly mixed after which from about 10 to 25 parts by weight of an alkali metal hydroxide is added. The final solution is stirred until the hydroxide is completely dissolved.

A more complete understanding of the invention can be obtained by considering the following examples. However, it should be understood that these examples are not intended to be unduly limitative of the invention.

EXAMPLE I

Three paint stripping compositions were prepared in order to determine the effectiveness of the addition of ethoxyethylamine and 3-methoxypropylamine to alkaline paint-stripping solutions. The first composition contained sodium hydroxide and a thickening agent in water whereas the second and third compositions contained the additives in addition to the aforementioned ingredients.

In preparing the paint stripping compositions, 40 parts by weight of a 50 percent by weight sodium hydroxide solution was diluted with a specified amount of water at ambient temperature. To this, 5 parts by weight of a starch-thickening agent was added and the solution was agitated until homogenous. In compositions two and three, 2 by weight of the amine additives were added and the solution was agitated until homogenous.

To test the effectiveness of each of the aforementioned compositions, 1-inch-by-2-inch railroad car panels, approximately 5 to 10 years old, were cut. These panels had two primer coats and four coats of enamel paint. Each panel was coated with one of the aforementioned compositions, left to stand for 1 hour, rinsed with water, dried with compressed air, and evaluated on the basis of the paint removed.

The composition of each paint stripper together with the results in terms of the paint removed for each composition is shown below in table A.

TABLE A

| | Parts by Weight of Each Ingredient | | |
|---|---|---|---|
| Composition | 1 | 2 | 3 |
| Sodium Hydroxide, 50% | 40 | 40 | 40 |
| Flotex 19[1] | 5 | 5 | 5 |
| Ethoxyethylamine | — | 2 | — |
| 3-Methoxypropylamine | — | — | 2 |
| Water | 55 | 53 | 53 |
| & of Paint Removed | 0 | 100 | 100 |

[1] Flotex 19—A starch composition for thickening alkaline solutions. Commercially available from National Starch and Chemical Corporation.

From the above, it can be seen that the use of ethoxyethylamine or 3-methoxypropylamine in combination with sodium hydroxide is effective for stripping enamel coated surfaces.

EXAMPLE II

The following example illustrates the effectiveness of a paint-stripping composition of the present invention wherein the concentration of sodium hydroxide is varied from about 10 to about 20 weight percent of the total composition.

Three paint-stripping compositions were prepared. These compositions were prepared by adding 4.5 parts by weight of a thickening agent to a specified amount of water at ambient temperature. To this was added 2 parts by weight of 3-methoxypropylamine. The solution was mixed thoroughly and then a specified amount of sodium hydroxide was added. The solution was stirred until homogenous.

To test the effectiveness of each of the compositions listed in table B below, 1-inch-by-2inch panels were painted with one coat of enamel primer and two coats of a standard enamel paint. The panels were aged 1 week to ensure complete drying, and then each panel was coated with one of the below-listed compositions. Several panels were coated with the same stripping composition. Each of these panels, at stated time intervals, was rinsed with water, dried with compressed air and observed. As soon as a panel was observed to be completely stripped of enamel the stripping time was recorded.

TABLE B

| Composition | Parts by Weight of Each Ingredient | | |
|---|---|---|---|
| | 4 | 5 | 6 |
| Sodium Hydroxide, 50% | 18.7 | 28.0 | 37.4 |
| Flotex 19 | 4.5 | 4.5 | 4.5 |
| 3-Methoxypropylamine | 2.0 | 2.0 | 2.0 |
| Water | 74.8 | 65.5 | 56.1 |
| Time to Strip, minutes | 30 | 16 | 15 |

From the above, it can be seen that paint-stripping compositions containing 9.35 percent by weight and higher concentrations of sodium hydroxide in combination with small amounts of alkoxyalkylamines are effective in removing enamel paint from enamel coated surfaces.

EXAMPLE III

The following example illustrates the effectiveness of a paint-stripping composition of the present invention wherein the concentration of alkoxyalkylamine is varied from about 0.5 to about 5 weight percent of the total composition.

Five paint-stripping compositions were prepared. These compositions were prepared in accordance with formulations listed in table C below. The method of formulating these compositions consisted of dissolving the thickening agent in water at ambient temperature, adding the amine, stirring until the amine was completely in solution, then adding sodium hydroxide and continuing the stirring until the composition was homogenous.

To test the effectiveness of each of the compositions listed in table C below, 1-inch-by-2-inch panels were painted with one coat of enamel primer and two coats of a standard enamel paint. The panels were aged for 1 week to insure complete drying, and then coated with the compositions listed below. Several panels were coated with the same stripping composition. Each of these panels, at stated time intervals, was rinsed with water, dried with compressed air, and observed. As soon as a panel was observed to be completely stripped of enamel, the stripping time was recorded.

TABLE C

| Composition | Parts by Weight of Each Ingredient | | | | |
|---|---|---|---|---|---|
| Sodium Hydroxide, 50% | 37.4 | 37.4 | 37.4 | 37.4 | 37.4 |
| Flotex 19 | 4.5 | 4.5 | 4.5 | 4.5 | 4.5 |
| 3-Methoxypropylamine | 0.5 | 1.0 | 2.0 | 3.0 | 5.0 |
| Water | 56.1 | 56.1 | 56.1 | 56.1 | 56.1 |
| Time to Strip, minutes | 25 | | 15 | 20 | 13 | 11 |

From the above, it can be seen that paint-stripping compositions containing 0.5 percent by weight and higher concentrations of alkoxyalkylamines in combination with sodium hydroxide are effective in removing enamel paint from enamel coated surfaces.

What is claimed is:

1. A paint-stripping composition consisting essentially of from about 10 to 25 percent by weight of an alkali metal hydroxide, from about 0.5 to 5 percent by weight of an alkoxyalkylamine having a molecular weight of less than 104 and a boiling point greater than 100° C., selected from the group consisting of ethoxyethylamine, 3-methoxypropylamine, 2-methoxypropylamine, propoxyethylamine, 2-ethoxypropylamine, 3-ethoxypropylamine, and the balance water, based on a total of 100 parts by weight.

2. A paint-stripping composition as in claim 1 wherein the alkali metal hydroxide is sodium hydroxide.

3. A paint-stripping composition as in claim 1 wherein the alkoxyalkylamine is ethoxyethylamine or 3-methoxypropylamine.

4. A paint-stripping composition as in claim 1 which includes a thickening agent to impart thixatropic properties.

5. A process for stripping enamel paint coatings from a coated surface comprising the steps of contacting the coating with an aqueous solution consisting essentially of from about 10 to 25 percent by weight of an alkali metal hydroxide, of from about 0.5 to 5 percent by weight of an alkoxyalkylamine having a molecular weight of less than 104 and a boiling point greater than 100° C., selected from the group consisting of ethoxyethylamine, 3-methoxypropylamine, 2-methoxypropylamine, propoxyethylamine, 2-ethoxypropylamine, 3-ethoxypropylamine, and the balance water, based on a total of 100 parts by weight, for a time sufficient to loosen the coating from the surface, and thereafter removing the loosened coating from the surface.

* * * * *